INVENTORS
HARRY K. HUDSON
ROBERT J. MARSHALL
BY
ATTORNEY.

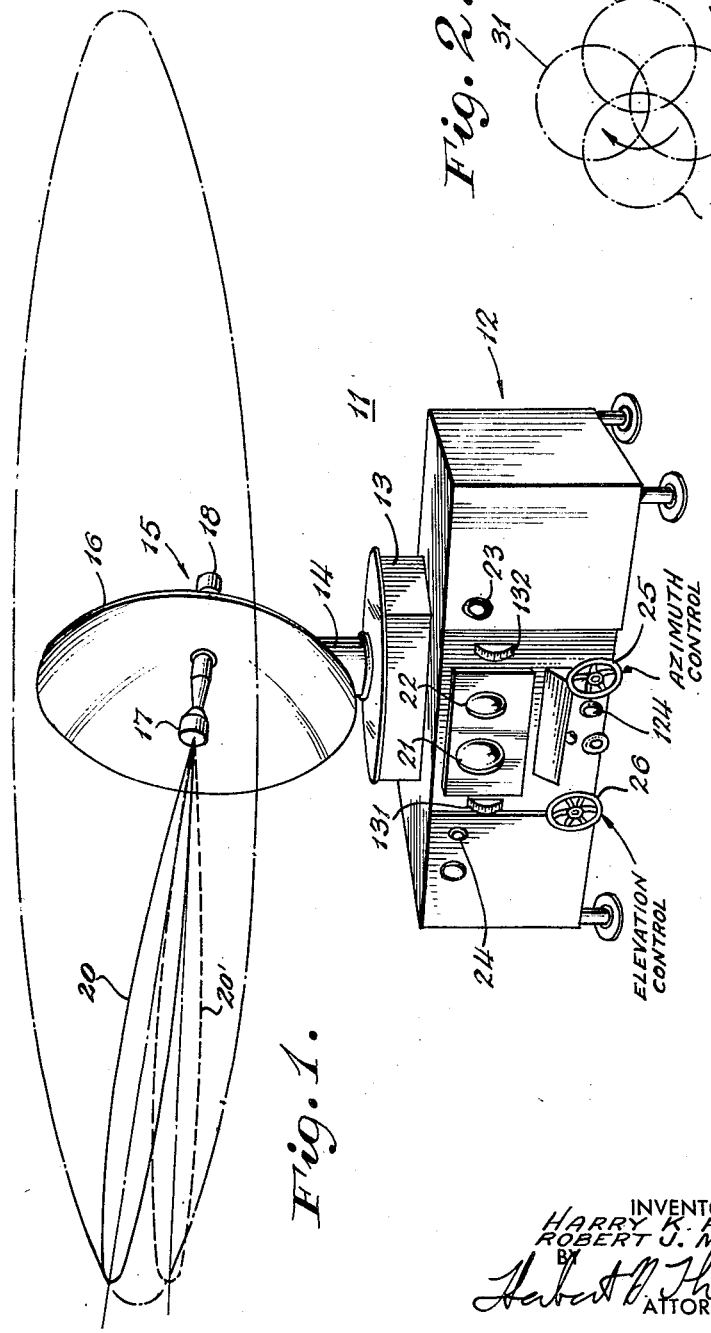

UNITED STATES PATENT OFFICE 2,557,967

SCANNING APPARATUS FOR RADAR SYSTEMS

Harry K. Hudson, Baldwin, and Robert J. Marshall, Garden City, N. Y., assignors to The Sperry Corporation, a corporation of Delaware Application October 2, 1945, Serial No. 619,752

2 Claims. (Cl. 250—33.51)

The present invention relates to radio object detection and tracking systems and radio object distance and direction determining systems, and is particularly concerned with apparatus for effecting a thorough search around the horizon for remote objects such as approaching aircraft.

Radio object detection systems, commonly referred to as "radar systems," wherein the direction of a remote object is determined in accordance with the direction of aiming of a highly directive antenna and its distance is determined in accordance with the time required for propagation of radio signals between the system and the object, have been constructed in varied forms to meet the demands of widely different applications.

The present invention is concerned with an arrangement for scanning an appreciable range of directions around the horizon and for scanning, as by "nodding," over a range of elevation which may be from substantially horizontal up to an appreciable angle of elevation. Such a system may be used for searching for approaching aircraft; and it may be arranged so that, after an approaching aircraft is detected, the regular rotation in azimuth and the regular variation in elevation of the antenna direction may be suspended; so that the aiming of the antenna thereafter may be varied slowly in accordance with the gradual variation of direction of the distant object from the scanning station.

Such a system may be employed on the ground or on shipboard. It may be used upon a level plain, or upon a point of high elevation, as upon a mountain peak or upon the top of a hill, and in the latter use, it may be desirable not only to search for distant objects around the horizon and up to appreciable angles of elevation, but also to search downward to an angle of depression below the horizontal.

An object of the present invention is to provide an improved radio object detection system capable of searching through an annular region such as a zone extending around the horizon and up to an appreciable angle of elevation.

It is a further object to provide an improved radio object detection system for searching through a predetermined range of directions for distant objects and for tracking a detected object.

Another object is to provide a simplified, rugged and reliable mechanism for varying the direction of aiming of a directive antenna smoothly through a predetermined zone of directions through which remote objects, such as aircraft, may be expected to approach.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In accordance with the present invention, a highly directive antenna is pivotally supported for variation of its elevation angle about a substantially horizontal axis in a column which, in turn, is pivotally supported for rotation about a vertical axis.

A simplified mechanism, including a cylindrical rack and an oscillatory rack driving pinion, is provided for controlling the orientation of the antenna directivity pattern in elevation from a stationary support, independently of the rotation in azimuth, so that the elevation of the antenna directivity pattern may be fully controlled without the requirement of slip rings, or of a separate elevation drive motor carried by the rotatable column.

Cam operated reversing switches are provided for periodically reversing the direction of variation of the elevation angle of the antenna directivity pattern by periodically reversing the direction of rotation of the rack driving pinion. A single fixedly positioned motor is provided for rotating the column and thus for rotating the antenna directivity pattern at a regular rate in azimuth and, also, for oscillating the rack driving pinion through the electric switch-controlled reversing mechanism.

The present invention will now be described in greater detail with reference to the accompanying drawings, wherein:

Fig. 1 is a general perspective view of a radio object detection system arranged in accordance with the present invention;

Fig. 2 is a sectional view through the conical zone of rapid variation of the antenna directivity pattern showing the successive loci of a cross section of the pattern at successive ultra high frequency pulse transmissions;

Figure 3:
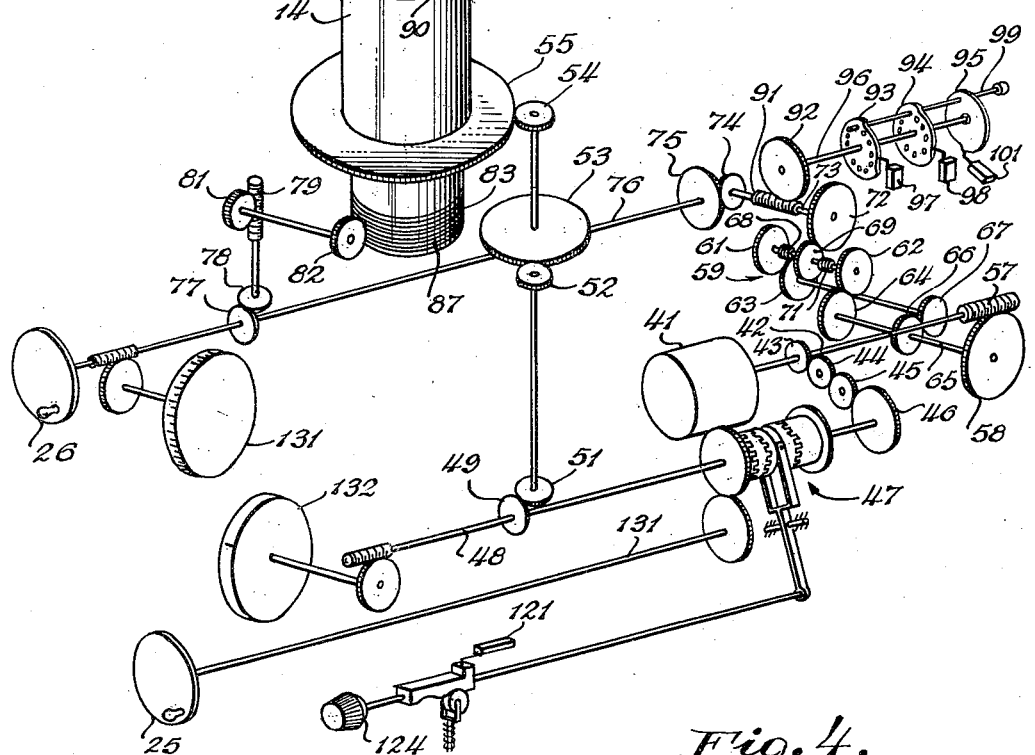
Fig. 3 is a schematic view of the antenna directivity pattern orientation control mechanism.

In Fig. 1, there is shown a radar system 11 comprising a control deck 12 having thereon a pedestal 13 including bearings within which a column 14 is arranged to rotate about a vertical axis. The column 14 supports a directive antenna assembly 15, including a paraboloidal reflector 16 and a radiator or exciter unit 17. The antenna assembly 15 is arranged for rotation about a horizontal axis relative to the column 14, so that it may be rotated in azimuth and nodded in elevation to cover an appreciable range of directions. The column 14, arranged in vertical-axis bearings in pedestal 13 and providing support for the rotation of the antenna system 15 about a vertical axis, thus provides a universal support for the antenna system 15.

A high-speed motor 18, positioned behind the paraboloidal reflector 16 and substantially coaxial therewith, is arranged to rotate the antenna exciter unit 17 about the axis of the reflector 16. The exciter unit 17 is arranged for directing ultra high frequency energy toward the paraboloidal reflector 16 from a point in the focal zone thereof but slightly displaced from the paraboloidal reflector axis, so that the rotation of the exciter unit 17 produces rapid variation through a slender conical locus of the directivity pattern 20 of the antenna system 15. This variation produced by the rotation of the exciter element 17 is indicated in Fig. 1 by the broken line view 20', which shows the antenna directivity pattern as shifted by the rotation through substantially 180° of the antenna exciter unit 17.

The control deck 12 of the radar system 11 includes a plan position indicating oscilloscope 21, a distance indicating oscilloscope 22, an azimuth control operator's oscilloscope 23, and an elevation control operator's oscilloscope 24. The latter two oscilloscopes supply tracking information to the operators of the system during manual control of the aiming of the antenna system 15. An azimuth control handwheel 25 is geared to control the azimuthal rotation of the column 14 and the antenna system 15, and an elevation control handwheel 26 is arranged for controlling the elevation angle of the antenna system 15, as will be hereinafter described.

The radar system 11 is arranged for transmitting through the directive antenna system 15, very short and relatively widely spaced pulses of ultra high frequency energy and for detecting corresponding pulses of energy reflected back to the antenna system 15, from a distant object which intercepts some of the transmitted energy. The frequency of transmission of the recurrent pulses is preferably made four times as great as the speed at which the exciter unit 17 is rotated about the axis of reflector 16 by the motor 18, and the pulse transmissions are synchronized with the rotation of the exciter unit in such a way that a pulse is transmitted when the exciter unit 17 is positioned for aiming the radio beam at the maximum angle of elevation relative to the axis of the paraboloidal reflector 16. A cross-sectional view of the directive beam transmitted at that time is illustrated at 31 in Fig. 2. The pulses are transmitted at intervals corresponding to 90° rotation of the exciter unit 17 and, accordingly, the variation of the directivity pattern of the antenna during a cycle of operation of motor 18 is as indicated by the successive cross-sectional directive pattern loci 32, 33 and 34. In one embodiment of the invention, the motor 18 rotates the exciter unit 17 at a speed of 100 revolutions per second, and the radar system transmits 400 pulses per second.

The primary purpose of the above-described variation at 100 cycles per second of the antenna directivity is to provide azimuth error and elevation error signals for guidance of the azimuthal handwheel operator and the elevation handwheel operator during the tracking of a distant object. For this purpose, the reflected signals resulting from transmission along the right-hand pattern 32 are compared in strength with the reflected signals resulting from transmission along the left-hand pattern 34, the comparative strengths of these signals being presented to the azimuth control operator by oscilloscope 23. Similarly, the signal strengths of reflected signals of the upper and lower directivity patterns 31 and 33 are compared in oscilloscope 24 viewed by the elevation control operator. Each of the operators manipulates his handwheel as required to maintain the compared pulses substantially equal, since equality of the received signals indicates that the axis of the reflector 16 is aligned with the object.

When the radar apparatus 11 is automatically scanning around the horizon in search of approaching objects, the rapid variation of the directivity of the antenna through the successive patterns 31, 32, 33 and 34 is continued, with the result that the average energy distribution of the antenna system 15 is effectively broadened, providing fast and effective coverage by the radar system of a large field of search.

In Fig. 3 is shown the mechanism in accordance with the present invention whereby a single fixedly positioned motive unit is employed for driving the antenna system in azimuth and elevation; and whereby alternate manual control is permitted either of the elevation of aiming, or of the elevation and azimuthal direction of aiming of the antenna system. A fixedly positioned motor 41 has a shaft 42 which is coupled through a first gear train to a ring gear 55 on the column 14, for regularly rotating the antenna system 15 in azimuth. The motor shaft 42 is coupled through a second gear train to a spur gear 82 engaging a cylindrical rack 83 formed on a tubular member 87 rotatable with the column 14, but axially slidable or translatable with respect thereto, for elevation angle control of the antenna system 15.

The azimuth drive gear train may be traced through spur gears 43, 44, 45 and 46, and through a manually controlled disengaging mechanism 47, to an azimuth control and indicator shaft 48. This shaft 48 is in turn coupled through miter gears 49 and 51 and through spur gears 52, 53 and 54 to the ring gear 55 concentric with and fixedly connected to the column 14.

The elevation drive gear train may be traced from the motor shaft 42 through a worm 57 and worm gear 58 to an electrically controlled rotation reversing system including a double magnetic clutch unit 59. The reversing system comprises two driven spur gears 61 and 62, rotated at equal speeds in opposite directions by spur gears 63 and 64. Gear 64 is connected directly to the worm gear 58 by a shaft 65, and gear 63 is coupled to the worm gear 58 through a pair of equal-diameter spur gears 66 and 67. The first magnetic clutch 68 is provided intermediate driven gear 61 and the output gear 69 of the reversible clutch system, while the second electromagnetic clutch 71 is provided intermediate the output gear 69 and the second driven gear 62.

The output gear 69 of the electromagnetic clutch reversing system engages a spur gear 72 upon a shaft 73 on which is provided a bevel gear 74 engaging a further bevel gear 75 for rotating the elevation control and indicator shaft 76. This shaft, through a pair of miter gears 77 and 78, and a worm 79 and a worm gear 81, supplies oscillatory motion to the rack driving pinion 82 to provide, through reciprocating translatory motion of cylindrical rack 83 along a vertical axis, an oscillatory motion of the antenna system 15 about the horizontal axis of the bearing 85 and the shaft 86.

The translatable member 87 is arranged for rotation with the column 14, as insured by a splined arrangement or keyed connection 90 therebetween, and for translatory movement relative to this column, under control of pinion 82. An upper rack extension 88 of the translatable cylindrical rack member 87 engages a spur gear 89 connected to the antenna system 15 for controlling the orientation of the antenna 15 in elevation.

The worm and worm gear system 91, 92 driven by shaft 73 is employed for rotating three switch cams 93, 94 and 95 in fixed relation to the variation of orientation of the antenna 15 about the horizontal axis of bearing 85 and shaft 86. Cams 93 and 94 include arcuate sectors arranged for operating single-pole, single-throw momentary snap switches 97 and 98, respectively, which may be of the type known as "Microswitches." Cam 95 is fixed to the shaft 96 which couples these cams to the worm gear 92, and thus is arranged in unvarying relation with respect to the orientation in elevation of the antenna system 15. Cams 93 and 94, however, are rotatable about the shaft 96, and each of these cams is provided with a series of perforations at fixed radius from the cam shaft, so arranged that the angular limits at which the switches 97 and 98 are operated may be fixed as desired by a selection of the perforations through which a cam alignment rod 99 is inserted. The cam 95 serves for operating a limit stop switch 101 which also may be of the switch type.

Figure 4:
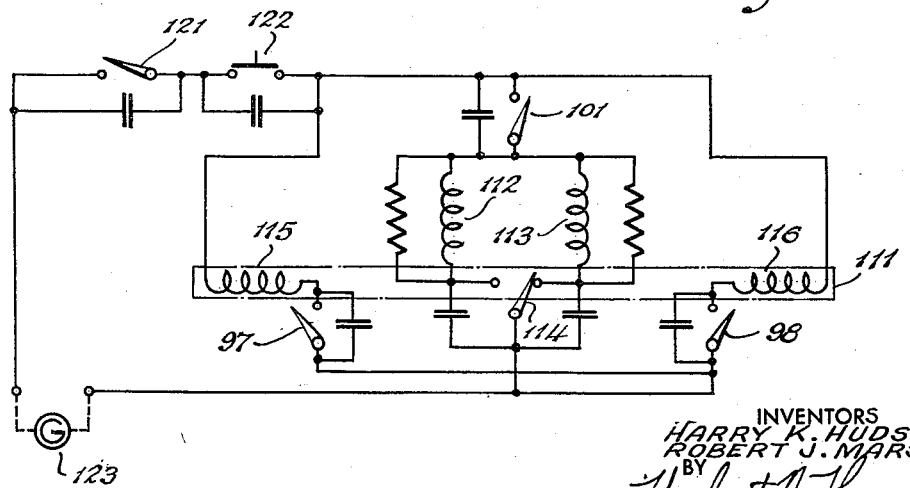
Fig. 4 is a circuit diagram showing the interconnection of the cam operated electric switches and the electrically operated reversible clutch mechanism of the structure shown in Fig. 3.

The switches 97, 98 and 101 controlled by the elevation limit cams are electrically connected for selectively controlling the electromagnetic clutches 68 and 71 in the double magnetic clutch reversing unit 59. The electric circuit through which these switches control the electromagnetic clutches is illustrated in Fig. 4. The coils 112 and 113 of the electromagnetic clutches 68 and 71, respectively, are arranged to be selectively connected by a double-pole, single-throw relay 111 including a movable contactor 114, to a source 123 of clutch energizing potential. The relay 111 includes two opposed coils 115, 116, the first being arranged to switch the movable contact element 114 into position for energizing the coil 112 of the electromagnetic clutch 68, and the coil 116 being arranged so that, upon energization thereof, the movable contact element 114 is shifted into position for energizing the coil 113 of electromagnetic clutch 71. The relay 111 is so constructed that after energization of one of the two relay coils, the movable contact element 114 remains connected to the associated stator contact element of the relay until the other coil of the relay is energized.

The lower nod limit switch 97 is connected in series with relay coil 115, and the upper nod limit switch 98 is connected in series with relay coil 116. When switches 121, 122 and 101 are closed, the electric energy supplied by the generator 123 maintains one coil of electromagnetic clutch 68 energized until the angle of elevation of the antenna system 15 has reached a desired limit. Assuming that the angle of elevation has just reached the upper limit and that switch 98 has momentarily been closed by cam 94, the movable contact element 114 of the relay will be in the illustrated position, energizing the coil 113 of the antenna-lowering electromagnetic clutch 71. Switches 97 and 98 remain open, and the movable contact element 114 of relay 111 remains in the position shown, until the desired lower limit of antenna elevation is reached. Then cam 93 momentarily will close switch 97, shifting the movable contact member 114 from the illustrated position into the opposite position, for energizing the coil 112 of the antenna-raising clutch 68.

While the movable contact member 114 is positioned as shown in Fig. 4, maintaining clutch 71 energized, gears 72 and 74 are rotated in the same direction as gear 58, causing cylindrical rack 83 and rack extension 88 to be lowered, and in turn bringing the angle of elevation of the antenna system 15 downward.

Portions only of the antenna system 15 and the column 14 being shown in skeleton form and the reflector 16 being omitted for the sake of clarity.

When the movable contact member 114 has been shifted to the opposite position, the directions of rotation of gears 69, 72, 74, 75, 77, 78, 79, 81, 82 and 89 are reversed, but their speeds of rotation are equal to the speeds of rotation during energization of clutch 71. Thus, the antenna elevation angle is varied upward and downward at equal rates of speed.

The cam 95 fixed to the shaft 96 is arranged so that the limit switch 101 normally remains closed during the motor driven elevation scan of the antenna system 15. The cam 95 is so arranged that it defines the over-all maximum limits between which the elevation angle of the antenna system 15 may be safely varied. Accordingly, if the lower limit switch 97 or the upper limit switch 98 fails to be operated by its actuating cam within the limits for which the system is constructed, or if the relay 111 fails to respond properly to the operation of one of these switches, then the over-all limit cam 95 prevents overdriving of the antenna system 15 by opening the safety switch 101 and thus deenergizing both electromagnetic clutches until attention is given to the system.

Swith 122 is a manual control switch for selection of automatic or manual elevation control of the antenna system 15, while switch 121 is a switch which, as illustrated in Fig. 3, is arranged to be actuated by a cam on the manual disengaging lever 124 connected to the azimuth drive disengaging mechanism 47. Switch 121 is provided so that an operator may simultaneously mechanically disengage the motor 41 from the azimuth control of the antenna, and electrically disengage the motor from elevation control of the antenna system, by pushing the lever 124 toward the front panel of the control deck 12. Capacitors may be provided across each of the control switches, and resistors may be connected across the relay coils 112, 113, as illustrated in Fig. 4, for the suppression of contact arcing and the insurance of a long life of trouble-free operation of the electric switch circuits.

When switch 122 is opened for manual elevation control, or when lever 124 is pushed inward for full manual control of the antenna system 15, the elevation operator may vary the elevation angle of the antenna system as desired by rotating the handwheel 26 on shaft 76. It will be noted that this handwheel remains coupled to the antenna elevation control system at all times, and thus it rotates first in one direction and then in the other during automatic elevation nod of the antenna system by motor 41.

When the lever 124 is moved toward the front panel of the control deck 12, the motor drive system is disengaged from the antenna system, and the azimuth handwheel 25 on shaft 131 is engaged, so that the antenna is thereafter made to rotate in azimuth in accordance with the rotation of handwheel 25.

As illustrated in Fig. 3, an elevation indicator dial 131 and an azimuth indicator dial 132 may be coupled to the shafts 76 and 46, respectively, for indicating the variation in elevation and azimuth of aiming of the antenna system 15 at all times, whether the system is manually controlled or automatically scanning.

In one embodiment of the present invention, the motor 41 operates at a speed of 1800 revolutions per minute. The gear ratios of the azimuth drive gear train are such that the antenna system 15 is rotated in azimuth at a speed of the order of 8 revolutions per minute; and the gear ratios in the elevation drive system are chosen for substantially one nod cycle per minute, the period for increasing the elevation angle being approximately one-half minute and the period for decreasing the elevation angle being equal thereto. The over-all limit cam 95 is arranged for limiting the range of operation in elevation in this embodiment to a maximum range of from −100 mils to +700 mils, while in practical use the cams 93 and 94 may be adjusted for limiting the elevation scan or nod of the antenna system 15 to such a range, for example, as 0 to 200 mils.

It will be obvious that by the use of unequal gear sizes for the reversing gears 66 and 67 in the elevation drive reversing mechanism, or by variation of size of either gear 63 or gear 64, the rate of increase of elevation angle could be made different from the rate of decrease thereof, in any desired ratio. However, in accordance with one of the features of the present invention, the aiming of the antenna 15 is raised and lowered at equal rates, so that a lattice-like pattern of scanning is provided. This aids materially in affording effective coverage of the searching range provided during both increasing and decreasing of the elevation angle, i. e., during upward and downward nod of the antenna system 15. Thus, an approaching object is detected by signals produced during the upward nod and also by signals produced during the downward nod of the antenna system 15.

This feature, together with the simple, inexpensive and positive electrical control of the nodding through the use of readily adjustable cam switches, and the arrangement for entirely mechanical control of aiming of the antenna system 15 through the use of a cylindrical rack system, makes the present radar system efficient, rugged and reliable, while rendering it simple and inexpensive to manufacture.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A scanning system comprising a directive antenna, a fixed position motor, means for connecting said motor to said antenna for rotating said antenna about a first azimuth axis, means for connecting said motor to said antenna for rotating said antenna about a second elevation axis, means for periodically reversing the direction of rotation about said second axis whereby the antenna is caused to nod, adjustable nod limit means comprising first cam means operable synchronously with the antenna nodding and arranged to operate the reversing means on movement of the antenna to a predetermined position in one direction about said second axis, second cam means operable synchronously with the antenna nodding and arranged to operate the reversing means on movement of the antenna to a predetermined position in the opposite direction about said second axis and means for changing the angular relation between said first and second cam means to adjust the nod limits.

2. A scanning system comprising a directive antenna, a fixed position motor, means for connecting said motor to said antenna for rotating the antenna about an azimuth axis, reversible means for connecting said motor to said antenna for rotating said antenna about an elevation axis and including a double magnetic clutch geared to said motor, a cylindrical rack arranged to nod said antenna about said elevation axis and coupled to said antenna, and a driving pinion coupled to said rack, said pinion being geared to the output of said double magnetic clutch whereby the antenna nods in elevation.

HARRY K. HUDSON.
ROBERT J. MARSHALL.

REFERENCES CITED

The following references are of record in the file of this patent:

UNITED STATES PATENTS

| Number | Name | Date |
|---|---|---|
| 92,678 | Weusthoff | July 13, 1869 |
| 2,087,021 | Criner et al. | July 13, 1937 |
| 2,101,830 | Babcock | Dec. 14, 1937 |
| 2,201,670 | Kraus | May 21, 1940 |
| 2,407,275 | Hays | Sept. 10, 1946 |
| 2,407,305 | Langstroth | Sept. 10, 1946 |
| 2,407,310 | Lundy | Sept. 10, 1946 |
| 2,410,666 | Leck | Nov. 5, 1946 |
| 2,410,827 | Langstroth | Nov. 12, 1946 |
| 2,410,831 | Maybarduk | Nov. 12, 1946 |
| 2,412,612 | Godet | Dec. 17, 1946 |
| 2,415,103 | Langstroth | Feb. 4, 1947 |
| 2,415,678 | Edwards | Feb. 11, 1947 |
| 2,446,024 | Porter et al. | July 27, 1948 |

FOREIGN PATENTS

| Number | Country | Date |
|---|---|---|
| 555,052 | Great Britain | Aug. 3, 1943 |